United States Patent
Eifert et al.

(10) Patent No.: US 11,780,438 B1
(45) Date of Patent: Oct. 10, 2023

(54) PREDICTIVE STOP-START CONTROL USING STATE OF FUNCTION DURING GLIDING

(71) Applicant: FORD GLOBAL TECHNOLOGIES, LLC, Dearborn, MI (US)

(72) Inventors: Mark Eifert, Park Ridge, IL (US); Pankaj Kumar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/899,869

(22) Filed: Aug. 31, 2022

(51) Int. Cl.
  *B60W 30/18* (2012.01)
  *B60W 20/10* (2016.01)
  *F02N 11/08* (2006.01)

(52) U.S. Cl.
  CPC ...... *B60W 30/18072* (2013.01); *B60W 20/10* (2013.01); *F02N 11/084* (2013.01); *F02N 11/0862* (2013.01); *B60W 2510/242* (2013.01); *B60W 2710/06* (2013.01); *F02N 2200/063* (2013.01)

(58) Field of Classification Search
  CPC ............ F02N 11/0825; F02N 11/0837; F02N 11/084; B60W 20/13; B60W 30/18072
  See application file for complete search history.

(56) References Cited

U.S. PATENT DOCUMENTS

| | | |
|---|---|---|
| 10,150,479 B2 | 12/2018 | Fabregas et al. |
| 10,996,277 B2 | 5/2021 | Books et al. |
| 2011/0241421 A1* | 10/2011 | Schaefer .......... H02J 7/1438 307/9.1 |
| 2015/0252770 A1* | 9/2015 | Books ............ B60W 20/40 701/99 |
| 2016/0097364 A1* | 4/2016 | Mikami .......... F02N 11/0862 701/102 |
| 2017/0225586 A1* | 8/2017 | Zhang ............. B60L 58/18 |
| 2019/0323474 A1* | 10/2019 | Namuduri ........ F02N 11/0851 |
| 2020/0278936 A1* | 9/2020 | Gopalakrishnan ... G06F 12/121 |
| 2021/0339652 A1 | 11/2021 | Heidinger et al. |
| 2022/0371531 A1 | 11/2022 | Eifert et al. |

FOREIGN PATENT DOCUMENTS

KR   101459449 B1   11/2014

* cited by examiner

*Primary Examiner* — Phutthiwat Wongwian
*Assistant Examiner* — Anthony L Bacon
(74) *Attorney, Agent, or Firm* — Frank L. Lollo; MacMillan, Sobanski & Todd, LLC

(57) ABSTRACT

A motor vehicle having a combustion engine for vehicle propulsion can be automatically stopped when engine propulsion is not needed, such as during a gliding condition when the vehicle is coasting down to a slower speed (e.g., stopping) or down an incline. The engine is automatically restarted as needed. To ensure a capacity of a battery or other electrical storage device to support nominal operation of electrical loads (including a starter motor for restarting the engine) during an Auto Stop event, predicted future states of a vehicle battery are determined using a battery state of function (SOF) in response to load transients that may need to be supported.

19 Claims, 6 Drawing Sheets

PREDICTIVE STOP-START CONTROL USING STATE OF FUNCTION DURING GLIDING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to motor vehicles having automatic stopping of a combustion engine when engine propulsion is not needed and automatic restarting of the combustion engine as needed, and, more specifically, to using predicted future states of a vehicle battery for determining an ability of the battery to support future restarting from an automatically stopped state.

Fuel economy of automobiles is an important attribute of vehicle performance, and is determined by the technology employed in its design, by driver behavior and actions, and by conditions under which the vehicle is used (e.g., speed, road design, weather, and traffic). Manufacturers continuously strive to deliver better fuel economy. One technology being increasingly used is commonly called Auto Stop-Start, wherein an internal combustion engine automatically shuts down when engine power is not needed (e.g., the vehicle has come to a stop or is gliding to a stop or gliding down an incline) and then restarts when needed. A type of Auto Stop-Start is stop-start-gliding functionality which stops the engine when the driver takes their foot from the accelerator pedal while the vehicle is still in motion. Auto Start-Stop technology can provide a 5% to 10% increased fuel efficiency, for example.

In addition to vehicle propulsion, the engine drives other vehicle systems such as an electrical generator (e.g., an alternator) for generating electricity to power electrical loads and to recharge an electrical storage battery. The battery is the sole or main source used to power the electrical loads (e.g., a starter motor) during the time that the electrical generator is not being driven by the stopped engine. Therefore, Stop-Start functionality in a vehicle should only be enabled if its starter battery or other energy storage device can supply sufficient power to (1) crank the combustion engine and successfully restart it, and (2) maintain a sufficient voltage on a low-voltage (12V) power distribution network for other electrical loads needed during the engine-stopped (gliding) state. Sufficient voltage may be defined as a minimum voltage threshold measured between a reference point (e.g., a positive battery terminal) and ground at which permissible electrical loads are able to operate with no loss of functionality. The permissible loads may include all electrical loads on the power distribution network or may be a subset of all loads if it is desired to increase the availability of Stop-Start by performing load management (e.g., deactivation of low priority loads).

Stop-Start-Gliding functionality shuts down an engine when propulsion torque is not requested by the driver, which may occur when the vehicle is driving downhill or when the driver is decelerating the vehicle. When the engine is shut down while the vehicle is rolling, active chassis components such as an electrically assisted power steering (EPAS) system and electrically-actuated brakes (e.g., anti-lock brakes) should function nominally, which means their voltage supply needs to remain above a predefined minimum value. If a sudden lane-change maneuver occurs, the EPAS components may draw in excess of 100 A with a rise time of less than 10 milliseconds. If the battery output voltage drops below the predefined threshold as the current rises, there may be issues for attempting to restart the engine or in connection with the operation of the EPAS or other electrical loads.

Conventionally, Auto Stop-Start functionality has been enabled/disabled based on a state of charge (SOC) of the battery and the battery's ambient temperature. Auto Stop-Start is disabled if the state of charge or ambient temperature are below thresholds. In practice, the thresholds are calibrated conservatively. This is because state of charge is an inexact indicator of the ability of a battery to provide a given discharge current over a period of time while the terminal voltage is above a threshold. The ability to judge battery capability becomes more inaccurate as the battery ages because as a battery ages its capacity shrinks, and its internal resistance rises. Hence, the power-delivery capability of an aged battery degrades, but this is not reflected in a state of charge measurement. Especially when a battery reaches the end of its life, the state of charge becomes a very poor indicator of power-delivery capability. The ability to use state of charge as a metric for power delivery capability is made more difficult by the inaccuracy of the measurement of state of charge. State of the art battery monitoring sensors can only estimate the state of charge to a maximum accuracy of around 10% in normal conditions.

Using conventional power management approaches such as monitoring power system state of charge together with measuring a voltage/current of an alternator or other energy generation system coupled to the battery may not provide adequate information to accurately determine whether the power source can deliver a certain amount of current and still remain above a baseline threshold voltage/current. Determining a state of charge in view of an energy output of a power source (e.g., an alternator) may not be determinative of a future functionality of power delivery or of operation of an active chassis power system.

In general, because state of charge is not a good metric to judge the ability of a battery to provide a given discharge while maintaining a minimum acceptable voltage across its terminals, calibrating an SOC threshold to not allow the engine to be shut off during a vehicle gliding state is difficult. A very high threshold may be chosen, but this may severely limit the frequency of enabled stop-start events. Another type of problem related to using the state of charge and temperature to enable stop-start is that some electrical loads (i.e., consumers of battery capacity) may draw high current transients while the engine is stopped. An example of such a load is electrically-assisted power steering. A driver may want to execute a steering maneuver, such as a lane change, while in a gliding mode with the engine off. If this is done, the steering gear may draw over 100 A and may cause the voltage of the power distribution network to drop below a desired threshold.

SUMMARY OF THE INVENTION

In order to enhance the availability of stop-start-glide functionalities, the present invention uses an estimate of a State of Function (SOF) of the battery in order to gauge its capability. An SOF value signifies a minimum value of the voltage response (i.e., a lowest anticipated voltage level which will be reliably present) as measured at the low-voltage (12V) battery terminals which results during an engine crank, an EPAS event, or other transient activation of an electrical load which is permitted to operate during a stopped state while in a gliding mode. While battery monitoring sensors on the market today are capable of estimating the minimum value of an immediate voltage response corresponding to a load that occurs immediately, they do not anticipate future battery capability. The present invention relates to how the voltage response to a future transient may be calculated, and how that information can be used by a controller to enable stop-start gliding functionality. Because the estimation of the SOF values takes battery aging and temperature into account, it is a more accurate estimate of battery capability than the state of charge. Thus, conservative calibration is not necessary, and the availability of stop-start-glide functionalities is enhanced. The technique of estimating the state of function in the future adds robustness to the inventive method and system, because the battery drain before the transient is taken into consideration by the SOF calculation.

The SOF value(s) may be used according to a control strategy which enables or disables stop-start-gliding functionality whenever the vehicle is decelerating. In order to enable stop-start-gliding functionality and actually commence an engine stopped state, a controller may compare the minimum value of the voltage response (SOF) to a predetermined threshold ($U_{Min}$) representing the minimum voltage requirement for electrically assisted power steering, electrically-assisted braking, and other chassis control actuators as well as the minimum voltage requirement for restarting (i.e., cranking) the vehicle. Hence, in order to enable gliding, the ability to control the vehicle in that state before the engine is restarted is estimated as well.

In one aspect of the invention, a method is provided for automatically stopping and starting a combustion engine in a motor vehicle. A gliding condition of the motor vehicle is detected in which a power delivered by the combustion engine can be removed and in which functioning of the motor vehicle can be supported by a battery. A plurality of battery state of function (SOF) values are determined, each corresponding to a respective permissible electrical load that may potentially be actuated during the gliding condition, wherein the battery SOF values each project a respective minimum voltage that would be available at a future time after actuation of the respective permissible electrical load based on an estimated current that would be drawn by the respective permissible electrical load. At least one of the battery SOF values is compared to a predetermined threshold voltage. If the combustion engine is operating to deliver the power to the motor vehicle and the gliding condition is detected, the combustion engine is automatically stopped provided that each battery SOF value in the comparing step is greater than the predetermined threshold voltage, whereby automatic stopping of the combustion engine is prohibited when any battery SOF value is less than the predetermined threshold voltage. If the combustion engine is in an automatically stopped state, then the combustion engine is automatically started when any battery SOF value in the comparing step falls below the predetermined threshold voltage.

In another aspect of the invention, a vehicle comprises a combustion engine having a stopped state and a started state, wherein the combustion engine generates propulsion to move the vehicle. A generator is driven by the engine to generate electrical power. A battery stores electrical power received from the generator. A plurality of permissible electrical loads operate on electrical power from the battery when the combustion engine is in the stopped state. A control circuit is configured to (a) detect a gliding condition of the vehicle in which the vehicle is moving without propulsion from the combustion engine; (b) determine a plurality of battery state of function (SOF) values each corresponding to a respective permissible electrical load that may potentially be actuated during the gliding condition, wherein the battery SOF values each project a respective minimum voltage that would be available at a future time after actuation of the respective permissible electrical load based on an estimated current that would be drawn by the respective permissible electrical load, (c) compare at least one of the battery SOF values to a predetermined threshold voltage, (d) when the combustion engine is operating to deliver the power to the motor vehicle and the gliding condition is detected, commence the stopped state of the combustion engine provided that each battery SOF value in (c) is greater than the predetermined threshold voltage, whereby automatic stopping of the combustion engine is prohibited when any battery SOF value in (c) is less than the predetermined threshold voltage, and (e) when the combustion engine is in the stopped state, then commence the started state of the combustion engine when any battery SOF value in (c) falls below the predetermined threshold voltage.

DETAILED DESCRIPTION OF PREFERRED EMBODIMENTS

Figure 1:
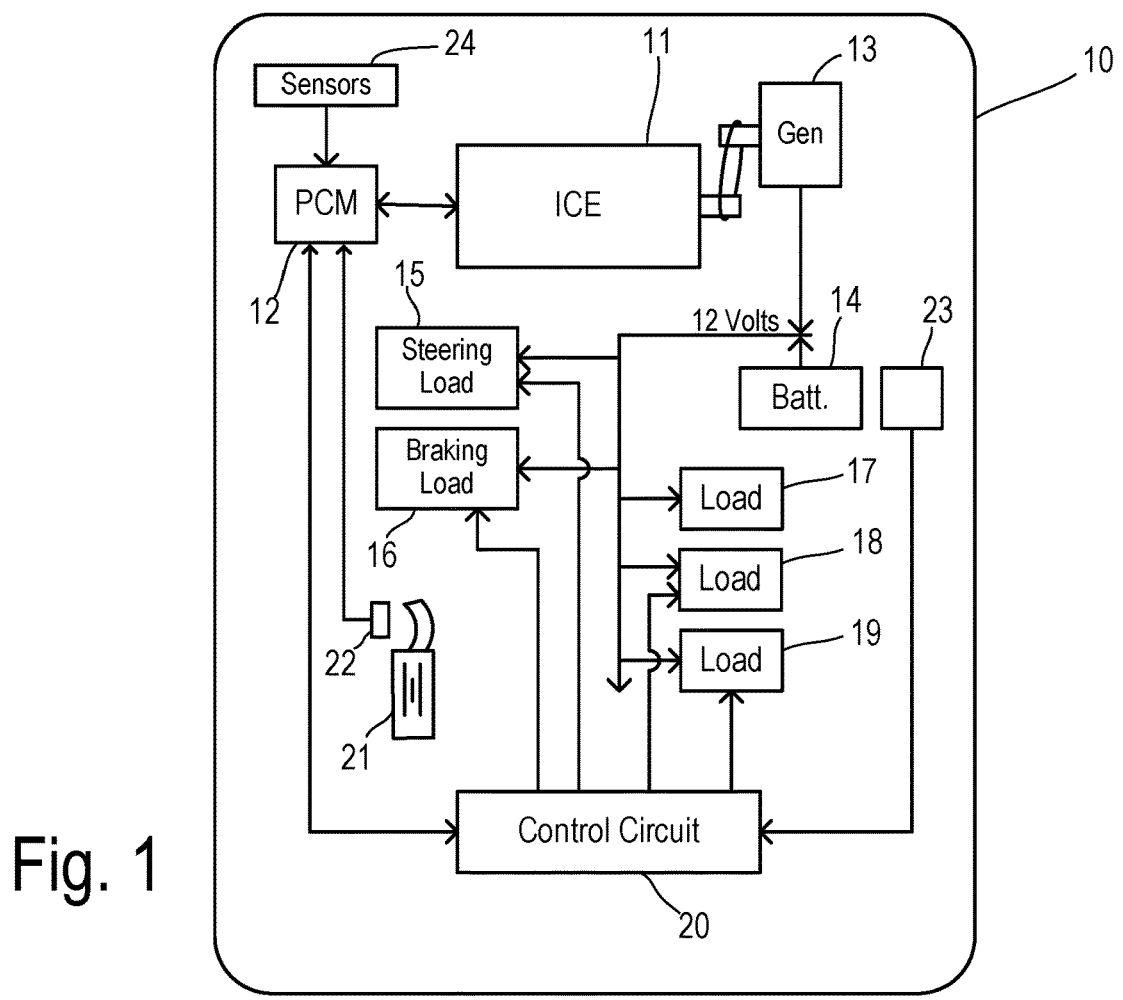
FIG. 1 is a block diagram showing a vehicle perform stop-start-gliding of the present invention.

Referring to FIG. 1, a vehicle 10 includes an internal combustion engine 11 and a powertrain control module (PCM) 12 which coordinates operation of engine 11. An electrical generator 13 (e.g., an alternator) is driven by combustion engine 11 to generate electricity which can be used to recharge a battery 14 and/or power various electrical loads 15-19 in a vehicle electrical system (e.g., a 12 Volt system). Battery 14 may be comprised of a standard starter battery, a battery pack, or other storage device such as a supercapacitor bank or a fuel cell. In some embodiments, vehicle 10 is a full or mild hybrid vehicle with a hybrid propulsion system (i.e., both combustion engine 11 and electrical traction motors). In addition to the low-voltage 12V electrical system, a hybrid vehicle has a high-voltage electrical system (e.g. 48V or hundreds of volts) providing the traction motor portion of the hybrid propulsion system (e.g., motors and high voltage battery pack), wherein the generator generates an output voltage higher than the low-voltage battery. A DC-DC converter is used for stepping down the output voltage of the generator to charge the low-voltage battery and to power the loads of the 12V electrical system.

The 12V loads include one or more steering loads 15 (e.g., EPAS components) and one or more braking loads 16 (e.g., electronically-actuated brakes). Loads 17-19 represent other vehicle systems and accessories. A plurality of all the electrical loads are considered herein to be "permissible loads," which will refer to those electrical loads which are permitted to operate during times that the vehicle is in an Auto Stop event (i.e., when electrical power is available only from battery 14 without support from generator 13).

A control circuit 20 for the present invention is coupled to PCM 12 and to a battery monitoring sensor device 23. Control circuit 20 may have connections to some of the loads (e.g., as shown with loads 15, 16, 18, and 19) in order to selectably enable or disable the loads and/or to obtain load data (e.g., temperature) useful to project current drawn by the load(s).

Vehicle 10 includes an accelerator pedal 21 with an associated pedal-position sensor which is coupled to PCM 12. Pedal position is one factor used by PCM 12 to detect a gliding vehicle state or the end of a gliding state.

Two examples of methods for calculating a minimum value of a voltage response of a battery to a future transient load (SOF) will be disclosed, along with a control strategy to enable stop-start gliding functionalities using the calculated SOF values as inputs. Thus, a voltage response to a future discharge event may be used by a control strategy to enable or disable Auto Stop during a gliding phase which has been detected in the normal manner by a powertrain system. Formally, the voltage response of a future discharge event (i.e., the SOF value) may be described as the minimum voltage that would be measured at the output terminals of the energy storage device when the load current $I_{Load}$ is drawn for a time period T at an ambient temperature $Temp_{DIS}$ after a wait period Tait during which the charge $Q_{Wait}$ is removed (i.e., depleted) from the energy storage device expressed as follows:

$$SOF\_MinU(I_{Load}, T, Temp_{Dis}, Q_{Wait}, T_{Wait}) = U_{Min}^{min} \text{ such that } I = I_{Load}$$

Figure 2:
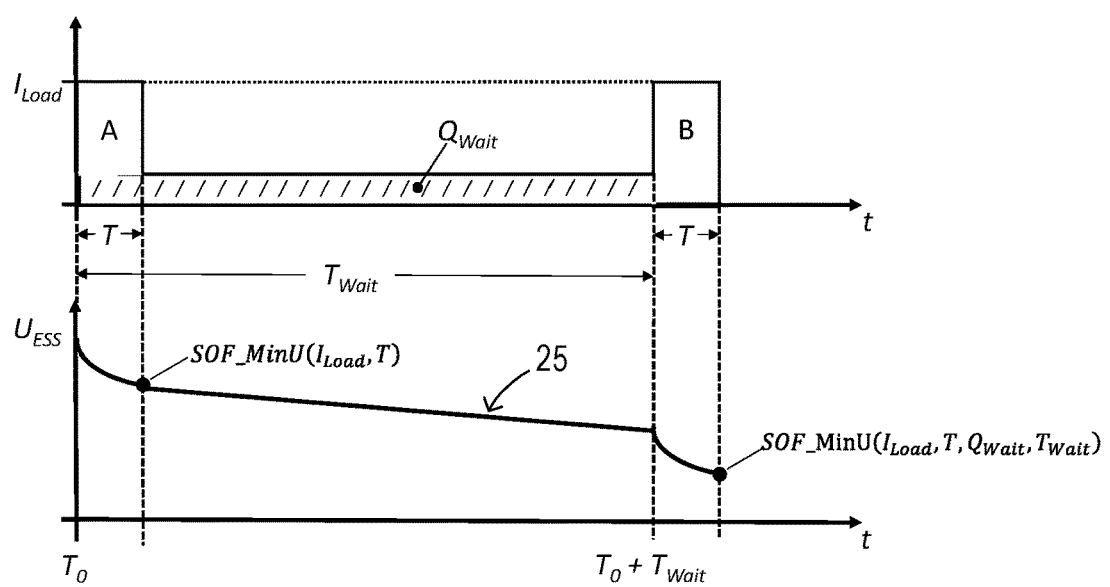
FIG. 2 is a graphic plot showing a time-varying Start of Function in response to load transients.

FIG. 2 illustrates the relationship between a current SOF value (which occurs in response to a pulse A) and a future SOF value (which occurs in response to a pulse B).

The voltage response of a future discharge event (referred to herein as an SOF value) defined as $SOF\_MinU(I_{Load}, T, Temp_{Dis}, Q_{Wait}, T_{Wait})$ includes the parameter $Q_{Wait}$ describing the charge or discharge history during the wait-period before the transient load parameterized by Load and pulse length T, the output value of which has units in ampere-seconds. This metric is a prediction of the lowest voltage that will occur over a relatively longer time horizon. In contrast, the voltage response of an immediate discharge event corresponds to a discharge that is assumed to begin at the point of time at which the SoF is calculated.

Another difference between an immediate and future predicted load response is that the ambient temperature when the discharge occurs is also used in the calculation of the future voltage response is a predicted value. This is to allow low temperatures to be predicted in the future when the load occurs (which provides a model which can mitigate a worst-case operational scenario). In contrast, the voltage response of an immediate discharge event assumes that the present temperature is valid during the discharge.

The voltage response of a future discharge event is not available in battery monitoring sensors. However, it may be calculated as described herein. Two optional calculation methods are described, one of which is a direct method and one of which is an indirect method.

Figure 3:
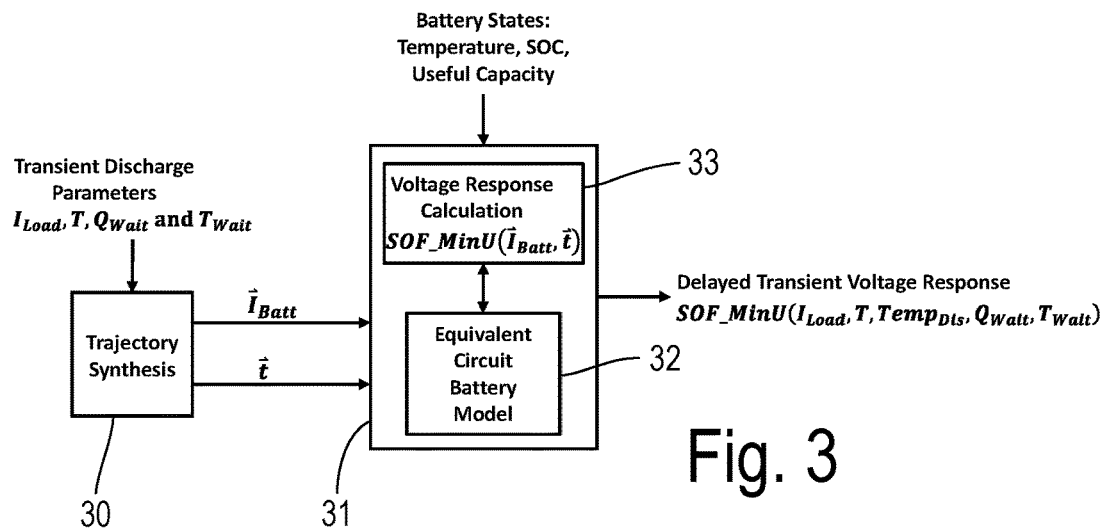
FIG. 3 is a block diagram showing a direct process for determining future SOF values.

In the direct method as shown in FIG. 3, a metric SOF_MinU for a defined battery current trajectory represents the minimum voltage that would be measured at the terminals of a battery after a defined current trajectory $SOF\_MinU(\vec{I}_{Batt}, \vec{t})$ flows at the terminals. The sign of the current trajectory may be positive, negative, or both, corresponding to discharging and charging, or having both occur over time.

The parameters $I_{Load}$, T, $Q_{Wait}$, $T_{Wait}$ correspond to a trajectory described by $\vec{I}_{Batt}$ and $\vec{t}$ which is provided by a trajectory synthesis block 30. This information is given as an input to an estimator block 31 containing an equivalent circuit battery model 32 and a calculation block 33. $I_{Load}$ represents the predicted magnitude of current flow during such an event, and T represents the duration of the event. The time until a next update occurs is represented by $T_{Wait}$, and the battery discharge during that time caused by active loads may be calculated as:

$$Q_{Wait} = I_{Wait} \cdot T_{Wait}.$$

Battery states used to calculate the voltage response may be provided by a battery monitoring sensor. In particular, the states may be used to initialize the model. Moreover, the model can be implemented with adaptive parameterization that accounts for aging of the battery. In addition to lead-acid batteries as an energy storage device, the present embodiment may be applied to vehicles with energy storage devices such as ultracapacitors or Li-Ion batteries as well. Equivalent circuit models with adaptive parameterization are known for each.

An SOF voltage response to a future discharge event may be estimated indirectly using a current state of function (e.g., determined using known calculations to characterize an immediate discharge event) together with information describing the relation between the open-circuit voltage of the battery at rest and its state of charge. Such an indirect method may be determined using less calculation time than a direct method, and may be easily implemented in an electronic control module. Only input data from an existing battery monitoring sensor is required.

In order to calculate $SOF\_MinU(I_{Load}, T, Temp_{Dis}, Q_{Wait}, T_{Wait})$, the voltage response for an immediate transient $SOF\_MinU(I_{Load}, T)$ is estimated by the battery monitoring sensor. This function already exists in common battery monitoring sensors. A relative voltage change associated with the transient is then calculated by subtracting immediate voltage response $SOF\_MinU(I_{Load}, T)$ from the measured voltage across the battery terminals $U_{BattMeas}$ and multiplying the result with the relative change in internal resistance of the battery corresponding to the difference between the current temperature $Temp_0$ and the predicted temperature $Temp_{Dis}$ at $T_{Wait}$:

$$\Delta U_{Trans} = (U_{BattMeas} - SOF2(I_{Load}, T)) \left( \frac{\rho_{Temp}(Temp_{Dis} - Temp_{Ref}) + R_{Ref}}{\rho_{Temp}(Temp_0 - Temp_{Ref}) + R_{Ref}} \right)$$

The coefficient $\rho_{Temp}$ represents a change in battery resistance with respect to temperature around a reference temperature $Temp_{Ref}$ and a corresponding resistance $R_{Ref}$. The reference temperature, resistance, and coefficient may be determined in response to pre-measured internal battery resistance at several temperatures (e.g., from a bench test or obtained from the battery supplier).

The change in the battery state of charge (SOC) during the wait period is proportional to $Q_{Wait}$ and a nominal (i.e., new) battery capacity $Q_{BattNom}$. The corresponding change in battery terminal voltage is a function of $Q_{Wait}$, $Q_{BattNom}$, and the difference between a battery open-circuit voltage at 100% SOC and the open-circuit voltage at 0% SOC, as follows:

$$\Delta U_{Wait} = (UBatt_{100\%} - UBatt_{0\%}) \left( \frac{Q_{Wait}}{Q_{BattNom}} \right)$$

The open-circuit voltages at 100% and 0% state of charge ($UBatt_{100\%}$ and $UBatt_{0\%}$, respectively) are parameters that are commonly used to calibrate a battery monitoring sensor and are readily available.

A length of time between the measurement of battery characteristics for the calculation of the voltage response of a delayed transient and the time at which battery charging ended also plays a role calculating SOF_MinU($I_{Load}$, T, $Q_{Wait}$, $T_{Wait}$). After charging is stopped, the measured voltage at the battery terminals naturally decays linearly until it reaches an open-circuit voltage that is proportional to its state of charge. The time that it takes to decay to the open-circuit voltage is a function of the charging voltage of the battery $U_{Charge}$ and its state of charge: $T_{Decay}$ ($U_{Charge}$, SOC). The relation between the charging voltage, the state of charge, and the decay period may be measured for a variety of charge voltages and state of charge values and captured in a table, or a single calibrated value of $T_{Decay}$ may be used with only a small decrease in the accuracy of the voltage response calculation. The value of $T_{Decay}$ may typically be between 1 to 12 hours depending on the battery size and other characteristics. If the wait time before the transient occurs Tait is greater than $T_{Decay}$ then the voltage response of a future transient discharge is only a function of the open-circuit voltage of the battery corresponding to the state of charge when the calculation is made OCV(SOC), the transient voltage response $\Delta U_{Trans}$, and the change in voltage due to the low discharge rate during the wait period $\Delta U_{Wait}$:

SOF_MinU($I_{Load}$,T,$Q_{Wait}$,$T_{Wait}$)=OCV(SOC)−$\Delta U_{Trans}$−$\Delta U_{Wait}$.

However, if $T_{Wait}$ is less than $T_{Decay}$, an additional term is added to the calculation of the voltage response:

$$\Delta U_{Decay} = (U_{Charge} - OCV(SOC)) \left( \frac{\Delta T_{Charge}}{T_{Decay}} \right),$$

where $\Delta T_{Charge}$ represents the absolute time difference between the end of charging and the time corresponding to the end of the wait period $T_{Wait}$. In this case, the voltage response is calculated as follows:

SOF_MinU($I_{Load}$,T,$Q_{Wait}$,$T_{Wait}$)=OCV(SOC)+$\Delta U_{Decay}$−$\Delta U_{Trans}$−$\Delta U_{Wait}$.

The previous two equations can be combined to define the indirect prediction of the voltage response (i.e., the SOF value) of a delayed transient (e.g., from operation of a permissible electrical load) for all values of $T_{Wait}$ and $T_{Decay}$:

SOF_MinU($I_{Load}$, T, $Q_{Wait}$, $T_{Wait}$) =

$$\begin{cases} OCV(SOC) + \Delta U_{Decay} - \Delta U_{Trans} - \Delta U_{Wait}, & \text{if } T_{Wait} < T_{Decay} \\ OCV(SOC) - \Delta U_{Trans} - \Delta U_{Wait}, & \text{otherwise.} \end{cases}$$

Various state of function (SOF) values are determined using the above methods, or other methods that will occur to those skilled in the art. Such SOF values are needed whenever conditions are present in which it may be possible to initiate an Auto Stop event. Typically, a powertrain control module (PCM) may be configured to detect when engine power is not expected to be needed for a certain amount of time. In particular, stop-start-gliding functionality may stop the engine when the driver takes their foot from the accelerator pedal (i.e., propulsion torque is not requested by the driver) while the vehicle is still in motion. Such stop-start functionality should only be enabled if the battery, batteries in a battery pack, or other available energy storage device can supply sufficient power to crank the engine when needed to restart and to maintain a sufficient voltage on the power distribution network during the stop event to operate any permissible loads. Permissible loads may include all electrical loads on the power distribution network or may be a subset of all the electrical loads (e.g., excluding low priority loads such as an electrically heated seat). Permissible loads may preferably include significant functions involved in vehicle maneuvering such as steering components and braking components.

To enable an engine stop event once gliding has been detected, the minimum value of the battery voltage response to a future transient discharge is evaluated. This is provided by a state of function metric (SOF value) denoted as SOF_MinU($I_{Load}$, T, $Temp_{Dis}$, $Q_{Wait}$, $T_{Wait}$) and calculated as shown above (e.g., using a direct or an indirect method). Since there may usually be several permissible loads that may be activated during a particular engine stop event, a respective SOF value may be determined for each permissible load since it is desired to ensure the ability of restart the engine and to handle any load actuation that may occur which has to be fully supported by the electrical storage device without assistance from the generator driven by the combustion engine. In the case where one or more of the permissible loads would always be expected to draw the greatest amount of electrical energy from the storage device, then it may be sufficient to only evaluate the SOF values for such load(s). Permissible loads which should be considered may include load transients corresponding to starting the engine, handling a steering input (e.g., when the vehicle is equipped with electrically-assisted steering), handling a braking maneuver (if applied to gliding control and the brakes are electrically actuated or the brake boost pressure is electrically generated), and any other permitted transient that may originate from any other vehicle domain (e.g., active chassis control, propulsion, or climate control). Worst-case versions of the transients should be defined and parameterized. The SOF values may preferably be requested at a frequency that is equal to or greater a value that provides one SOF value during the time $T_{Wait}$, wherein $T_{Wait}$ is chosen to be longer than the maximum time required to start the engine because that is the maximum time required to mitigate an undesired how-voltage state.

When a state of function value is needed for any specific electrical load, an onboard battery model may run a simulation using a corresponding load trajectory and current battery states. The predicted minimum value of the voltage response (i.e., SOF value) of each future transient under consideration may be continuously broadcast with a repetition frequency that is greater or equal to a frequency corresponding to $T_{Wait}$. Depending on the architecture of a particular implementation, the voltage response may be requested by the battery monitoring sensor at a frequency meeting this criterion, or a battery monitoring sensor may be programmed to automatically send a sequence of predicted voltage responses at the proper frequency.

Figure 4:
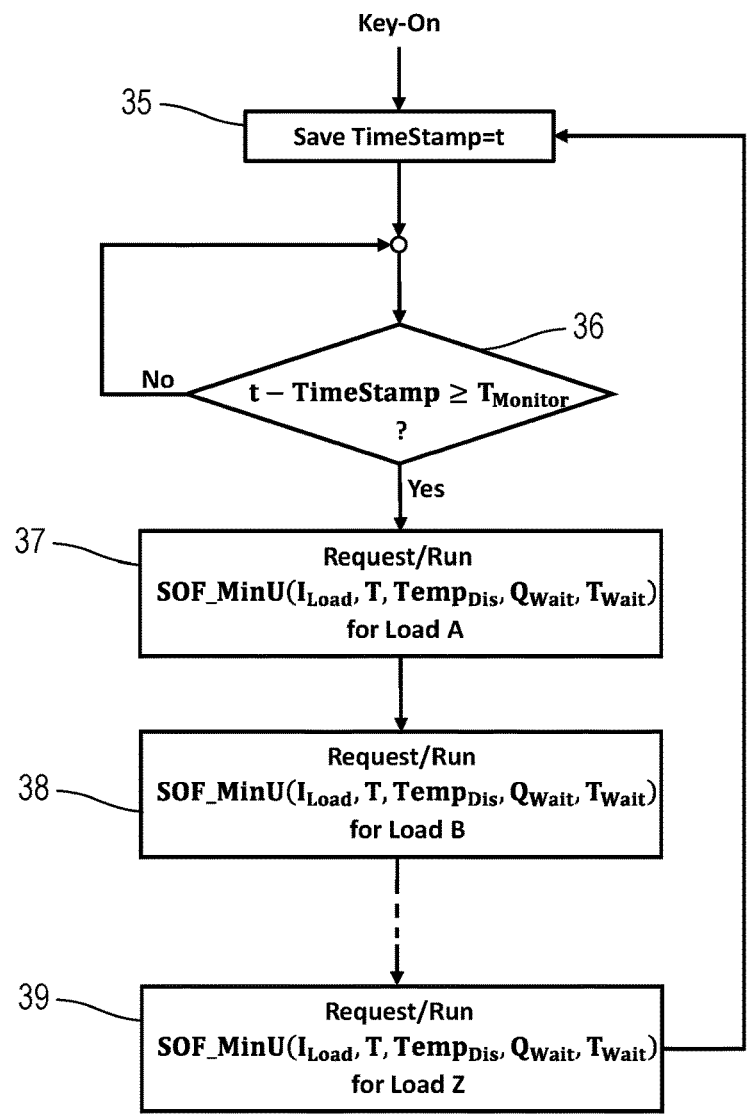
FIG. 4 is a flowchart of a method for implementing the process of FIG. 3.

FIG. 4 shows a flowchart for cyclically repeating the determination of SOF values for a plurality of permissible electrical loads using a direct method. In response to activation of a vehicle by a driver issuing a key-on command, a TimeStamp is set to a value of a current operational time (t) in step 35. Thereafter, a difference between the current operational time (t) and the saved TimeStamp value is compared to a monitoring time $T_{Monitor}$ in step 36. The value of $T_{Monitor}$ is set according to obtain a frequency of measurements that ensures changing conditions of the battery and/or loads are all adequately captured. Once a time greater than or equal to $T_{Monitor}$ has elapsed, respective SOF values are collected for one or more permissible loads. As shown, an SOF value for a Load A is obtained in step 37, an SOF value for a Load B is obtained in step 38, and additional SOF values up to and including a Load Z are obtained through to a step 39. A controller which performs the stop-start functionality may run the direct method of forming SOF values itself or may request that another device such as a battery monitor perform the method.

Figure 5:
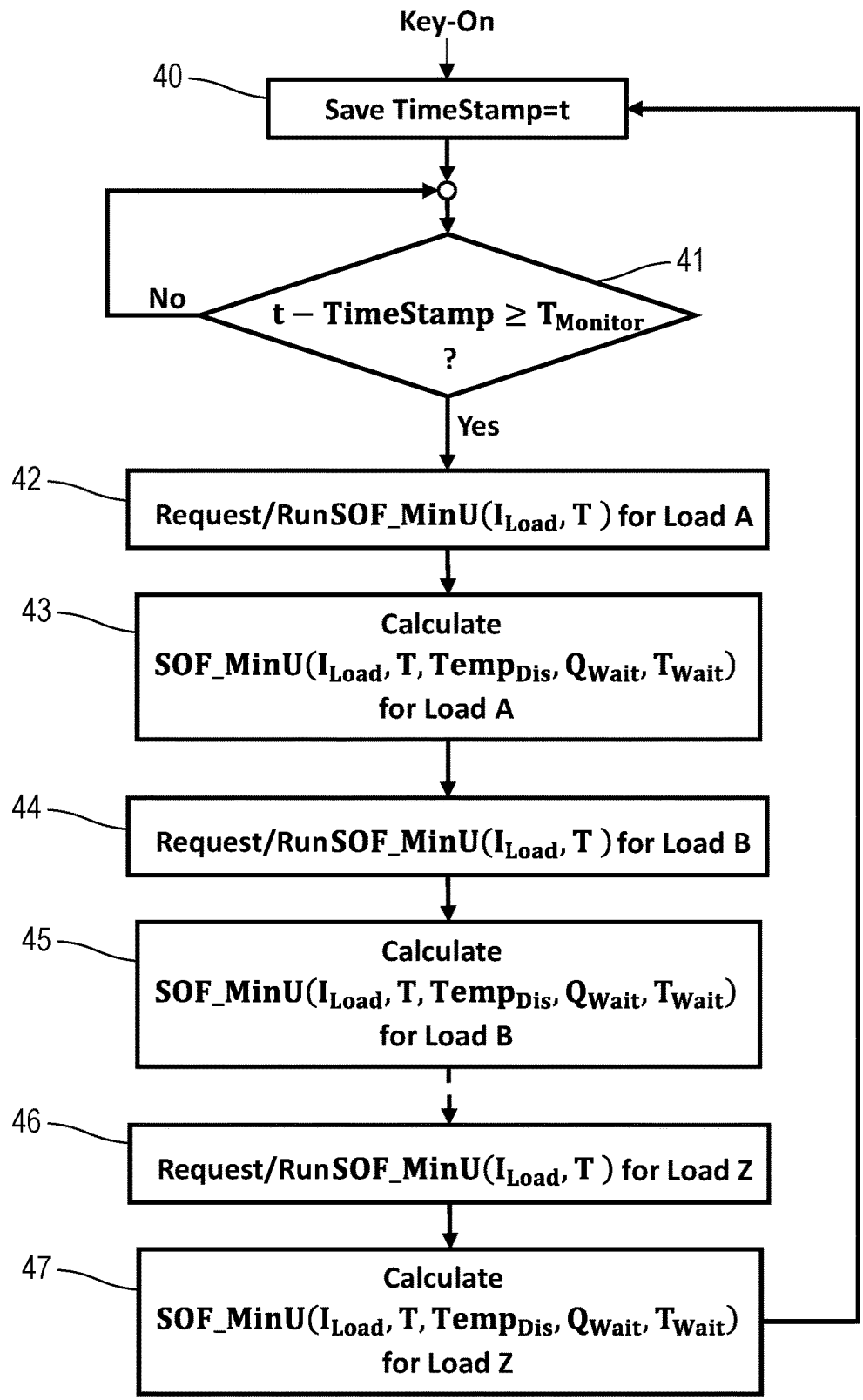
FIG. 5 is a flowchart of a method for implementing an indirect process of determining future SOF values.

FIG. 5 shows a flowchart for cyclically repeating the determination of SOF values for a plurality of permissible electrical loads using an indirect method. In response to activation of a vehicle by a driver issuing a key-on command, a TimeStamp is set to a value of a current operational time (t) in step 40. Thereafter, a difference between the current operational time (t) and the saved TimeStamp value is compared to a monitoring time $T_{Monitor}$ in step 41. The value of $T_{Monitor}$ is set according to obtain a frequency of measurements that ensures changing conditions of the battery and/or loads are all adequately captured. Once a time greater than or equal to $T_{Monitor}$ has elapsed, respective SOF values are collected for one or more permissible loads. In this case, a battery monitoring sensor unit of a type that is commercially available provides an estimate of the voltage response of an immediate transient $SOF\_MinU(I_{Load}, T)$ for each respective electrical load in steps 42, 44, and 46. Using the data from the battery monitoring sensor unit, a controller for the present invention calculates the future SOF values in steps 43, 45, and 47. Thereafter, a return is made to step 40 for storing a new value for TimeStamp and then updating the SOF values.

Figure 6:
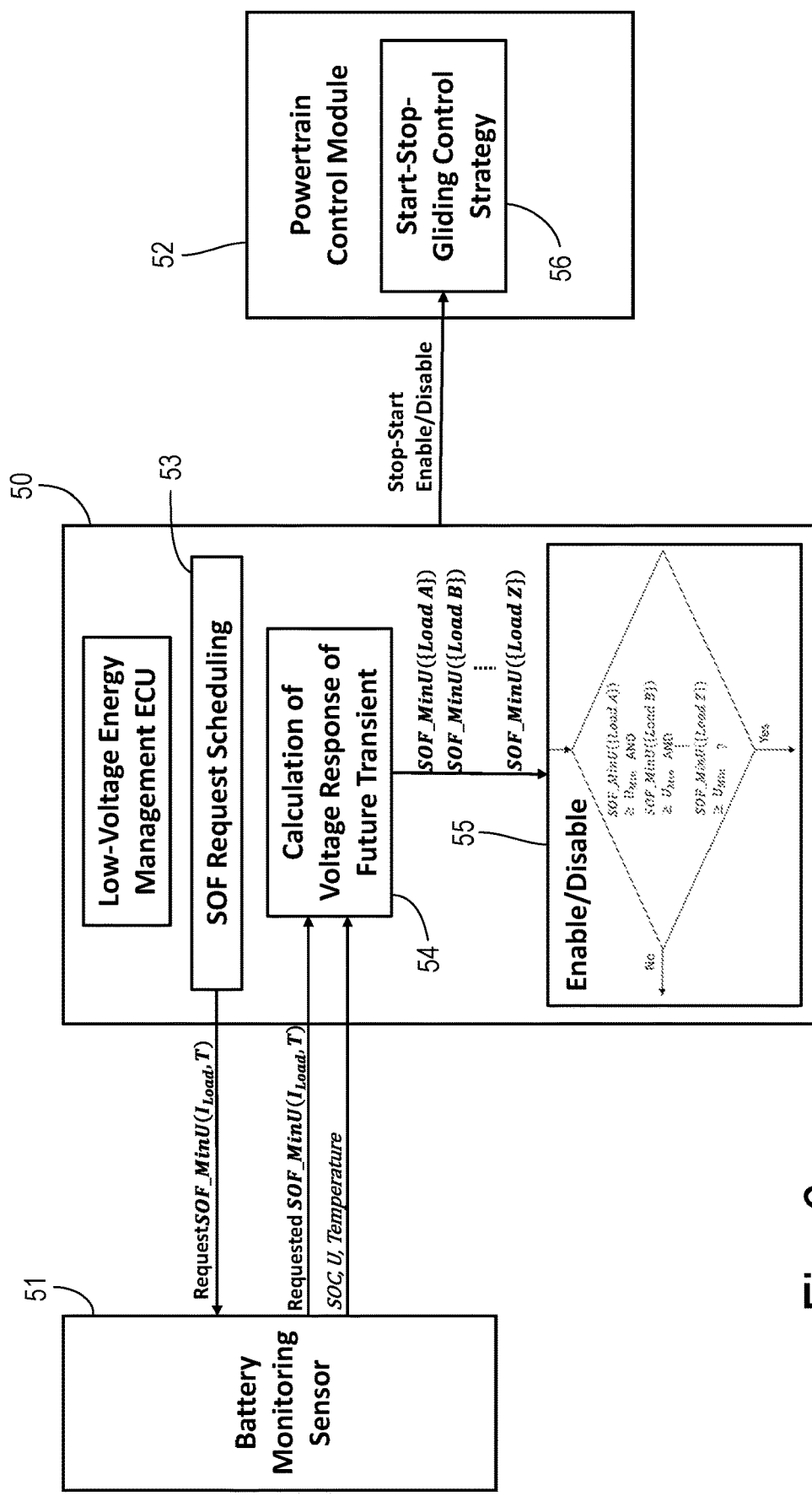
FIG. 6 is a hardware block diagram according to an embodiment of the invention.

FIG. 6 shows a hardware system having a controller 50 representing a low-voltage energy management electronic control unit operating according to the present invention. Controller 50 is coupled to a battery monitoring sensor 51 and a powertrain control module 52. Controller 50 includes a SOF Request Scheduling block 53 which sends requests to sensor 51 according to the elapsed time from the last timestamp (e.g., according to step 41 in FIG. 5). A calculation block 54 receives present SOF values and battery start information from sensor 51 and uses them to calculate the future SOF values. A decision block 55 analyzes the future SOF values to determine whether stop-start-gliding should be enabled to shut down the engine or should be disabled, using a process that will be described below. An Enable/Disable determination is reported to a start-stop-gliding control block 56 in PCM 52.

A powertrain controller may typically be responsible for identifying the conditions when the engine may be shut down. Criteria used by the powertrain controller may include an identification of the condition during which the driver or cruise control is not requesting propulsion torque and a determination of the ability of the battery to support a restart and possible load transients. Those criteria which are related to the state of the powertrain and the predicted intentions of the driver are referred to as "Powertrain Criteria." The Powertrain Criteria may include any factors known in the art. For example, the Powertrain Criteria for engine shutdown and restart may include throttle or gas pedal position, brake pedal position, and other driver inputs or vehicle states. If the powertrain criteria are satisfied and the monitored voltage responses are above a calibrated minimum voltage threshold $U_{Min}$, then an initiation of a stop-event is enabled.

Figure 7:
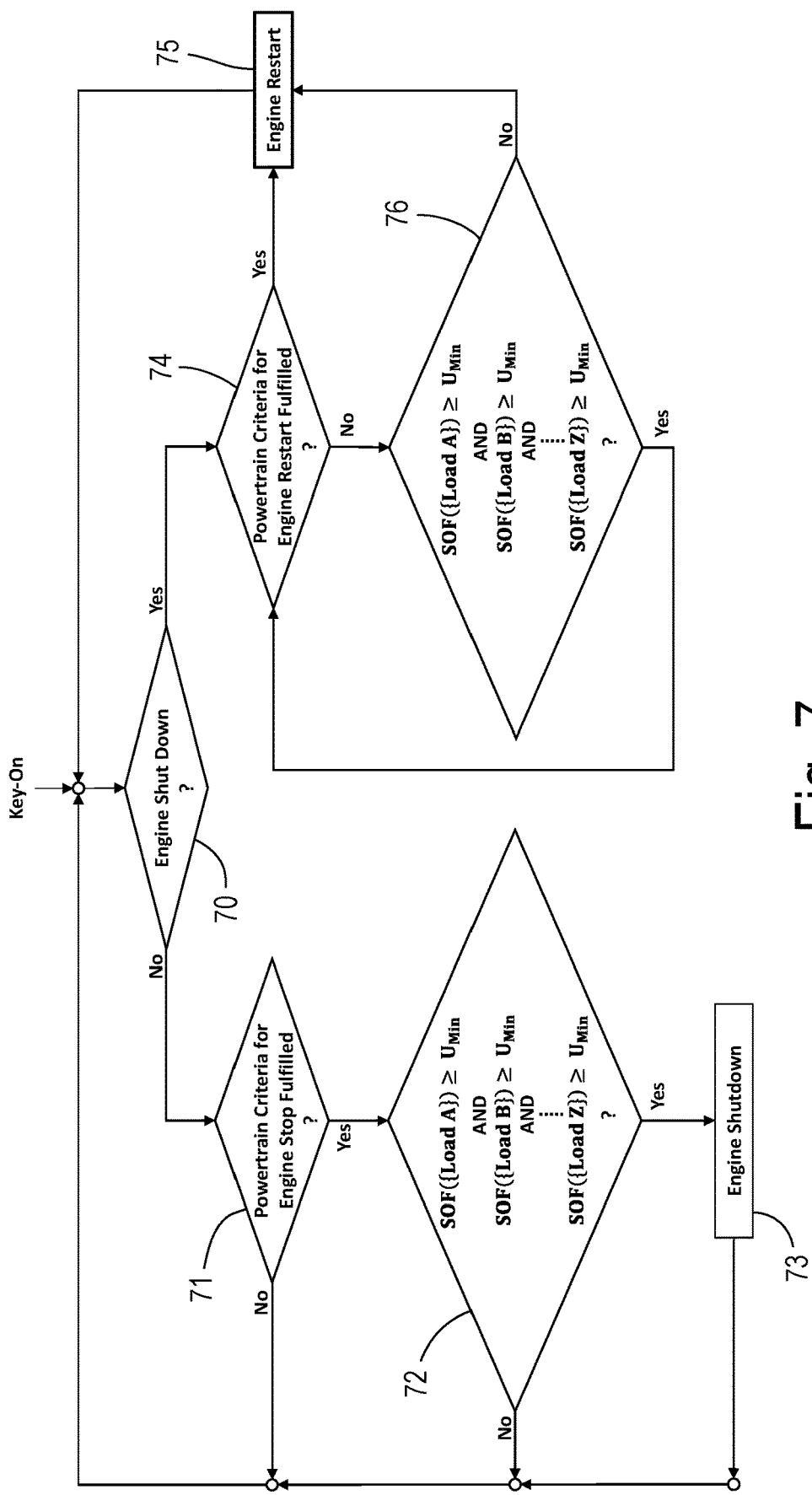
FIG. 7 is a flowchart according to a method of the invention.

Referring to FIG. 7, a general strategy is shown for conditioning the activation of Auto Stop events during gliding upon the future SOF values. During vehicle operation (e.g., after a key-on command and then periodically until a key-off command), a check is performed in step 70 to determine whether the combustion engine is already shut down. If not, then a check is performed in step 71 to determine whether the Powertrain Criteria are fulfilled. If not, then a return is made to step 70 to wait for an appropriate time to conduct a next iteration. If yes, then the future SOF values are obtained for each electrical load under consideration and then each SOF value is compared to the minimum voltage threshold $U_{Min}$. If all the SOF values are greater than or equal to threshold $U_{Min}$, then the engine is shut down in step 73. If any comparison shows an SOF value less than threshold $U_{Min}$ then the engine is allowed to continue to run and a return is made to step 70.

When step 70 determines that the engine is already shut down, then a check is made in step 74 to determine whether Powertrain Criteria are fulfilled which indicate a restart (e.g., torque is now being requested by the driver, as indicated by action on an accelerator pedal). If yes, then the engine is automatically restarted in step 75. If no, then a new set of future SOF values are obtained for each electrical load under consideration and then each SOF value is compared to the minimum voltage threshold $U_{Min}$. If all the SOF values are greater than or equal to threshold $U_{Min}$, then the engine shut down is allowed to continue and a return is made to step 74. If any comparison shows an SOF value less than threshold $U_{Min}$ then the engine is restarted in step 75.

Because the monitoring period of the transient voltage response is chosen long enough such that the engine has time to be restarted before the transient occurs, there is little chance that a transient load will cause the voltage to drop to a level below the minimum threshold while the engine is shut down. Therefore, problems with latency in mitigation strategies that monitor system voltage are eliminated. In addition, the availability of the stop-start-gliding functionality is enhanced, because it is no longer based on a calibrated state of charge and temperature thresholds. The state of function metric enhances the availability of the stop-start functionality because SOF is a direct measure of power delivery capability that is more accurate than making an interpretation using the state of charge. Calibrating the future SOF strategy is more straightforward than calibrating with a SOC-based strategy, because the voltage thresholds for an SOF-based strategy may be directly derived from requirements cascaded to the power supply system from the loads.

Figure 8:
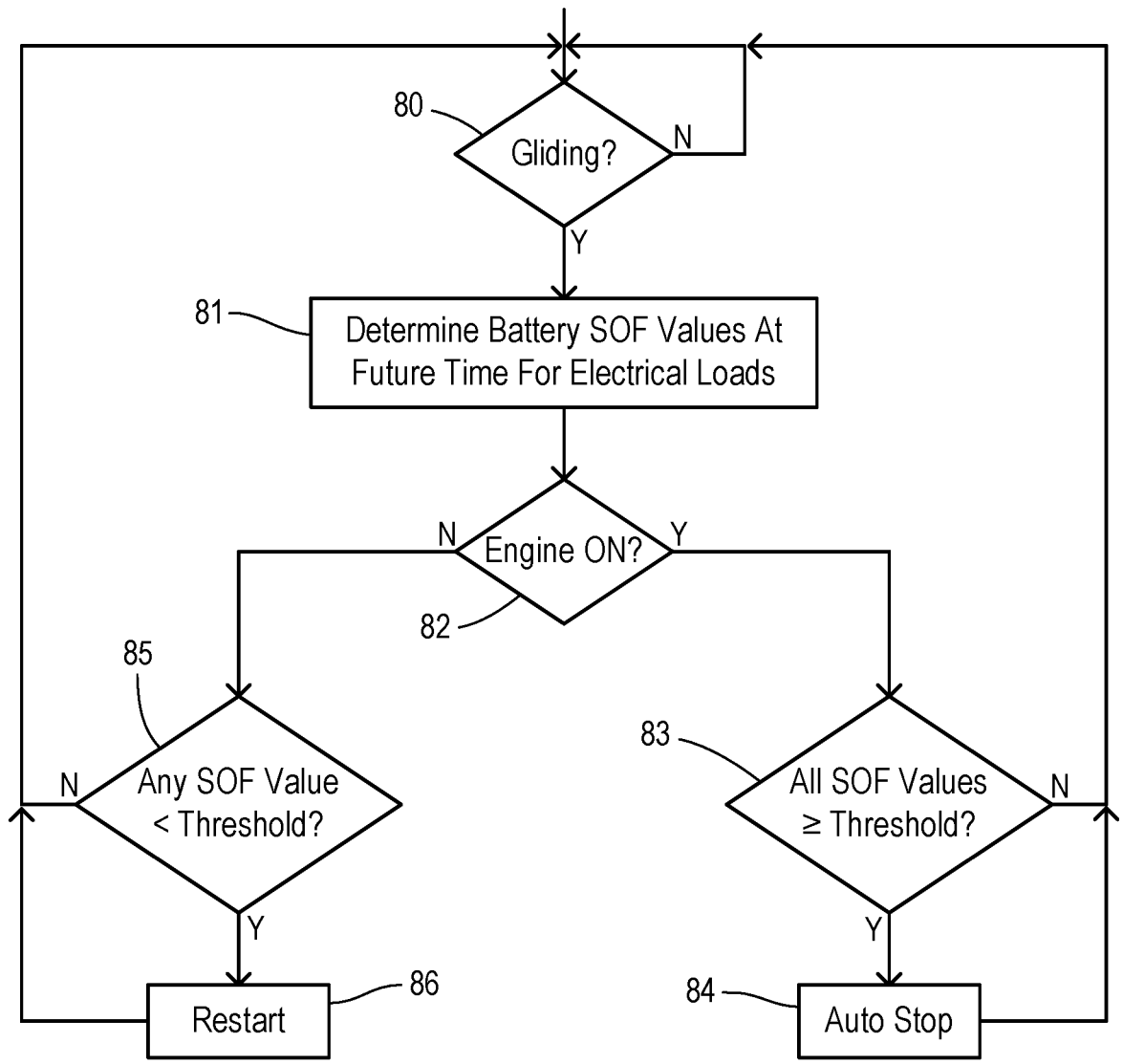
FIG. 8 is another flowchart according to a method of the invention.

The aspects of a stop-start-gliding strategy relating to the capability of the electrical storage device (e.g., battery) to support necessary actions to be taken while in a shut down state are shown in the general method of FIG. 8. In step 80, a check is performed to detect whether a gliding condition is present in which power delivered to the vehicle by the combustion engine could potentially be removed (e.g., the vehicle is coasting without the need for engine torque). In order to take advantage of a potential gliding condition, it must be determined whether functioning of the motor vehicle can be supported by the battery. In step 81, a plurality of battery state of function (SOF) values, each corresponding to a respective permissible electrical load that may potentially be actuated during the gliding condition, are determined. The battery SOF values each project (i.e., estimate) a respective minimum voltage that would be available at a future time after actuation of the respective permissible electrical load based on an estimated current that would be drawn by the respective permissible electrical load (and potentially on other factors such as battery parameters).

In step 82, a check is performed to determine whether the combustion engine is On (i.e., running) or is already in an Auto Stop state. If the engine is On, then at least one of the battery SOF values is compared to a predetermined threshold voltage in step 83. All of the SOF values may be compared to the predetermined threshold voltage, especially where the potential currents drawn by different loads may be different at different times. In some embodiments, one or more of the permissible loads may be consistently represented by the highest potential current draw which may enable the decision of enabling or disabling Auto Stop during gliding to be made considering only the one or more loads. If all the SOF values which are considered in step 83 are greater than or equal to the threshold voltage then an Auto Stop event is initiated in step 84. After either the Auto Stop event is initiated in step 84 or a determination is made in step 83 that not all of the SOF values are greater than or equal to the threshold voltage then a return is made to step 80. Thus, automatic stopping of the combustion engine is prohibited so long as any battery SOF value in the comparison is less than the predetermined threshold voltage.

If the engine is not On in step 82 (i.e., an Auto Stop event is in progress), then a check is performed in step 85 to determine whether any one of the SOF values is less than the predetermined threshold voltage. If not, then the Auto Stop event can continue and a return is made to step 80. Otherwise, automatic stopping of the combustion engine is prohibited. A restart is executed in step 86, thereby ending the Auto Stop event before returning to step 80. Thus, the combustion engine is automatically started when any battery SOF value falls below the predetermined threshold voltage.

What is claimed is:

1. A method of automatically stopping and starting a combustion engine in a motor vehicle, comprising the steps of:
   (a) detecting a gliding condition of the motor vehicle in which a power delivered by the combustion engine can be removed and in which functioning of the motor vehicle can be supported by a battery;
   (b) determining a plurality of battery state of function (SOF) values each corresponding to a respective permissible electrical load that may potentially be actuated during the gliding condition, wherein the battery SOF values each project a respective minimum voltage that would be available at a future time after actuation of the respective permissible electrical load based on an estimated current that would be drawn by the respective permissible electrical load;
   (c) comparing at least one of the battery SOF values to a predetermined threshold voltage;
   (d) if the combustion engine is operating to deliver the power to the motor vehicle and the gliding condition is detected, automatic stopping the combustion engine provided that each battery SOF value in step (c) is greater than the predetermined threshold voltage, whereby automatic stopping of the combustion engine is prohibited when any battery SOF value in step (c) is less than the predetermined threshold voltage; and
   (e) if the combustion engine is in an automatically stopped state, then automatically starting the combustion engine when any battery SOF value in the comparing step falls below the predetermined threshold voltage.

2. The method of claim 1 wherein battery SOF values of all the respective permissible electrical loads are compared to the predetermined threshold voltage in step (c).

3. The method of claim 1 wherein the permissible electrical loads include loads performing a function relating to maneuvering the motor vehicle.

4. The method of claim 3 wherein one of the permissible electrical loads is comprised of a steering component.

5. The method of claim 3 wherein one of the permissible electrical loads is comprised of a braking component.

6. The method of claim 1 wherein the permissible electrical loads include an electrical component having a highest current draw among all electrical loads supplied by the electrical storage unit, and wherein the highest current draw electrical component corresponds to the at least one of the battery SOF values which is compared to the predetermined threshold voltage.

7. The method of claim 1 wherein the predetermined threshold voltage corresponds to a minimum voltage at which the permissible electrical loads all operate with no loss of functionality.

8. The method of claim 1 wherein steps (b) through (e) are cyclically repeated.

9. The method of claim 1 wherein the battery is comprised of a battery pack.

10. A vehicle comprising:
   a combustion engine having a stopped state and a started state, wherein the combustion engine generates propulsion to move the vehicle;
   a generator driven by the engine to generate electrical power;
   a battery storing electrical power received from the generator;
   a plurality of permissible electrical loads operating on electrical power from the battery when the combustion engine is in the stopped state; and
   a control circuit configured to:
      (a) detect a gliding condition of the vehicle in which the vehicle is moving without propulsion from the combustion engine;
      (b) determine a plurality of battery state of function (SOF) values each corresponding to a respective permissible electrical load that may potentially be actuated during the gliding condition, wherein the battery SOF values each project a respective minimum voltage that would be available at a future time after actuation of the respective permissible electrical load based on an estimated current that would be drawn by the respective permissible electrical load;

(c) compare at least one of the battery SOF values to a predetermined threshold voltage;

(d) when the combustion engine is operating to deliver the power to the motor vehicle and the gliding condition is detected, commence the stopped state of the combustion engine provided that each battery SOF value in (c) is greater than the predetermined threshold voltage, whereby automatic stopping of the combustion engine is prohibited when any battery SOF value in (c) is less than the predetermined threshold voltage; and (e) when the combustion engine is in the stopped state, then commence the started state of the combustion engine when any battery SOF value in (c) falls below the predetermined threshold voltage.

11. The vehicle of claim 10 wherein battery SOF values of all the respective permissible electrical loads are compared to the predetermined threshold voltage in (c).

12. The vehicle of claim 10 wherein the permissible electrical loads each performs a function relating to maneuvering the motor vehicle.

13. The vehicle of claim 10 wherein one of the permissible electrical loads is comprised of a steering component.

14. The vehicle of claim 10 wherein one of the permissible electrical loads is comprised of a braking component.

15. The vehicle of claim 10 wherein the permissible electrical loads include an electrical component having a highest current draw among all electrical loads supplied by the electrical storage unit, and wherein the highest current draw electrical component corresponds to the at least one of the battery SOF values which is compared to the predetermined threshold voltage.

16. The vehicle of claim 10 wherein the predetermined threshold voltage corresponds to a minimum voltage at which the permissible electrical loads all operate with no loss of functionality.

17. The vehicle of claim 10 wherein (b) through (e) are cyclically repeated.

18. The vehicle of claim 10 wherein the battery is comprised of a low-voltage 12V battery.

19. The vehicle of claim 18 wherein the permissible loads are connected in a low-voltage electrical system, the vehicle further comprising:

a high-voltage electrical system for a hybrid propulsion system, wherein the generator generates the electrical power at an output voltage higher than the low-voltage battery; and a DC-DC converter for stepping down the output voltage of the generator to charge the low-voltage battery and to power the permissible loads.

\* \* \* \* \*